(12) United States Patent    (10) Patent No.:     US 8,167,332 B2
Lin                         (45) Date of Patent:        May 1, 2012

(54) FOLDING STROLLER

(75) Inventor: Michael Lin, Taichung (TW)

(73) Assignee: Sentiment Industries Ltd., Taichung (TW)

( * ) Notice: Subject to any disclaimer, the term of this patent is extended or adjusted under 35 U.S.C. 154(b) by 61 days.

(21) Appl. No.: 12/869,574

(22) Filed: Aug. 26, 2010

(65) Prior Publication Data
US 2012/0049485 A1    Mar. 1, 2012

(51) Int. Cl.
B62B 5/08    (2006.01)
(52) U.S. Cl. ........ 280/642; 280/639; 280/647; 280/650; 280/657
(58) Field of Classification Search .................. 280/638, 280/639, 642, 644, 42, 647, 649, 650, 657, 280/658, 47.34, 47.38, 47.4
See application file for complete search history.

(56) References Cited

U.S. PATENT DOCUMENTS

| 3,995,882 | A  | * | 12/1976 | Watkins ........................ 280/649 |
| 4,386,790 | A  | * | 6/1983  | Kassai ........................... 280/650 |
| 4,765,645 | A  | * | 8/1988  | Shamie .......................... 280/644 |
| 5,755,455 | A  | * | 5/1998  | Chen et al. ................... 280/642 |
| 6,308,805 | B1 | * | 10/2001 | Lan ................................ 188/20 |
| 6,322,097 | B1 | * | 11/2001 | Lan .............................. 280/642 |
| 6,322,098 | B1 | * | 11/2001 | Lan .............................. 280/642 |
| D452,462  | S  | * | 12/2001 | Lan ............................. D12/129 |
| 6,428,034 | B1 | * | 8/2002  | Bost ............................. 280/650 |
| 6,811,178 | B2 | * | 11/2004 | Tomasi et al. ................. 280/650 |
| 6,830,254 | B2 | * | 12/2004 | Lan .............................. 280/47.4 |
| 6,843,499 | B2 | * | 1/2005  | Guo .............................. 280/642 |
| 6,951,342 | B2 | * | 10/2005 | Lan .............................. 280/47.4 |
| 7,434,827 | B2 | * | 10/2008 | Yeh et al. ...................... 280/642 |
| 7,445,228 | B2 | * | 11/2008 | Henry .......................... 280/639 |
| 7,731,220 | B2 | * | 6/2010  | Chen et al. ................... 280/639 |
| 7,832,744 | B2 | * | 11/2010 | Chen et al. ................... 280/47.4 |
| 7,900,952 | B2 | * | 3/2011  | Cone, II ....................... 280/650 |
| 7,918,467 | B2 | * | 4/2011  | Cheng ........................... 280/38 |
| 8,066,300 | B2 | * | 11/2011 | Ohnishi ........................ 280/647 |
| 2002/0113414 | A1 | * | 8/2002 | Tomasi et al. ................ 280/650 |
| 2004/0145157 | A1 | * | 7/2004 | Guo .............................. 280/642 |
| 2004/0150174 | A1 | * | 8/2004 | Lan .............................. 280/47.4 |
| 2004/0226133 | A1 | * | 11/2004 | Lan .............................. 16/18 R |
| 2005/0012306 | A1 | * | 1/2005 | Lan .............................. 280/647 |
| 2006/0197313 | A1 | * | 9/2006 | Yeh et al. ...................... 280/642 |
| 2006/0237948 | A1 | * | 10/2006 | You et al. ...................... 280/642 |
| 2008/0143082 | A1 | * | 6/2008 | Chen et al. ................... 280/650 |
| 2008/0217966 | A1 | * | 9/2008 | Cone ............................. 297/47 |
| 2009/0102149 | A1 | * | 4/2009 | Ohnishi ..................... 280/47.38 |
| 2009/0134604 | A1 | * | 5/2009 | Ohnishi ........................ 280/649 |
| 2009/0243260 | A1 | * | 10/2009 | Longenecker et al. ....... 280/642 |
| 2010/0133789 | A1 | * | 6/2010 | Tanizaki et al. .............. 280/642 |
| 2011/0156374 | A1 | * | 6/2011 | Cheng .......................... 280/642 |
| 2011/0175305 | A1 | * | 7/2011 | Chen et al. ................... 280/30 |

* cited by examiner

Primary Examiner — John R Olszewski
Assistant Examiner — Brodie Follman

(57) ABSTRACT

A folding stroller of the present invention includes four struts, two sliding members, a fore double bar linkage, an aft double bar linkage and two linking bars. The sliding members are slidably disposed on one of the struts separately. The aft double bar linkage includes two aft bars. The fore double bar linkage includes two fore bars. The aft bars, the fore bars and the linking bars are separately pivotally connected one of the sliding member to one of the struts. As such, users may fold or unfold the folding stroller easily by moving the sliding members.

8 Claims, 4 Drawing Sheets

US 8,167,332 B2

FOLDING STROLLER

BACKGROUND OF THE INVENTION

1. Field of the Invention

The present invention relates to a stroller which is foldable.

2. Description of the Prior Art

Strollers, buggies or baby carriages are provided for babies and parents. Parents or babysitters may put the baby in a stroller to escape from muscle fatigue.

Some strollers are foldable, such as the stroller shown in TW465508, so that users can store or carry the strollers with a smaller space. The stroller includes a fore strut, which has an A part and a B part. There are bending joints on the A part and the B part. The A part is pivotable with respect to the B part, so that the stroller is foldable. Unfortunately, the bending joints may bring many troubles to both users and producers. A stroller, which has too many bending joints, is difficult to be folded. When the quantity of the bending joints is raised, the quantity of components of the stroller is also raised. The cost of fabrication is increased.

Therefore, another stroller is provided, as shown in U.S. Pat. No. 6,811,178. The stroller is provided with a sliding mechanism, so that the lower struts of the stroller can slide with respect to the upper struts of the stroller. The lower struts and the upper struts are closed up. Moreover, more another stroller, as shown in U.S. Pat. No. 6,428,034, is provided with a sliding mechanism. The sliding mechanism includes two collapsible rod mechanisms, which are connected to the legs of the stroller. As such, the stroller is foldable.

The present invention is, therefore, arisen to provide another kind of folding stroller, which has sliding mechanisms.

SUMMARY OF THE INVENTION

The main object of the present invention is to provide another stroller, which has sliding mechanism and is foldable.

To achieve the above and other objects, a folding stroller of the present invention includes a first fore strut, a first aft strut, a second fore strut, a second aft strut, a first sliding member, a second sliding member, an aft double bar linkage, a fore double bar linkage, a first linking bar and a second linking bar. The folding stroller has a first side and a second side.

The first fore strut is located on the first side. A first fore wheel is disposed on a bottom end of the first fore strut.

The first aft strut is located on the first side. A top end of the first aft strut is pivotally connected to the first fore strut. A first aft wheel is disposed on a bottom end of the first aft strut.

The second fore strut is located on the second side. A second fore wheel is disposed on a bottom end of the second fore strut.

The second aft strut is located on the second side. A top end of the second aft strut is pivotally connected to the second fore strut. A second aft wheel is disposed on a bottom end of the second aft strut.

The first sliding member is slidably disposed on the first aft strut. The first sliding member is slidable between its first position and its second position.

The second sliding member is slidably disposed on the second aft strut. The second sliding member is slidable between its first position and its second position.

The aft double bar linkage comprises a first aft bar and a second aft bar. A top end of the first aft bar is pivotally connected to the first sliding member. A bottom end of the first aft bar is pivotally connected to a predetermined position of the second aft strut. The predetermined position of the second aft strut is located between the second sliding member and the second aft wheel. A top end of the second aft bar is pivotally connected to the second sliding member. A bottom end of the second aft bar is pivotally connected to a predetermined position of the first aft strut. The predetermined position of the first aft strut is located between the first sliding member and the first aft wheel.

The fore double bar linkage comprises a first fore bar and a second fore bar. A rear end of the first fore bar is pivotally connected to the first sliding member. A front end of the first fore bar is pivotally connected to the second fore strut. A rear end of the second fore bar is pivotally connected to the second sliding member. A front end the second fore bar is pivotally connected to the first fore strut.

A front end of the first linking bar is pivotally connected to the first fore strut. A rear end of the first linking bar is pivotally connected to the first sliding member.

A front end of the second linking bar is pivotally connected to the second fore strut. A rear end of the second linking bar is pivotally connected to the second sliding member.

The first sliding member and the second sliding member bunch the fore double bar linkage and the aft double bar linkage up when the first sliding member and the second sliding member move upward to their first positions. The first fore strut and second fore strut are closed up, and the first aft strut and the second aft strut are closed up. The first sliding member and the second sliding member make the first linking bar and the second linking bar swing, so that the fore wheels and the aft wheels are closed up.

The first sliding member and the second sliding member unfold the fore double bar linkage and the aft double bar linkage when the first sliding member and the second sliding member move downward to their second positions. The first fore strut and the second fore strut are opened up, and the first aft strut and the second aft strut are opened up. The first sliding member and the second sliding member make the first linking bar and the second linking bar swing, so that the fore wheels and the aft wheels are opened up.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
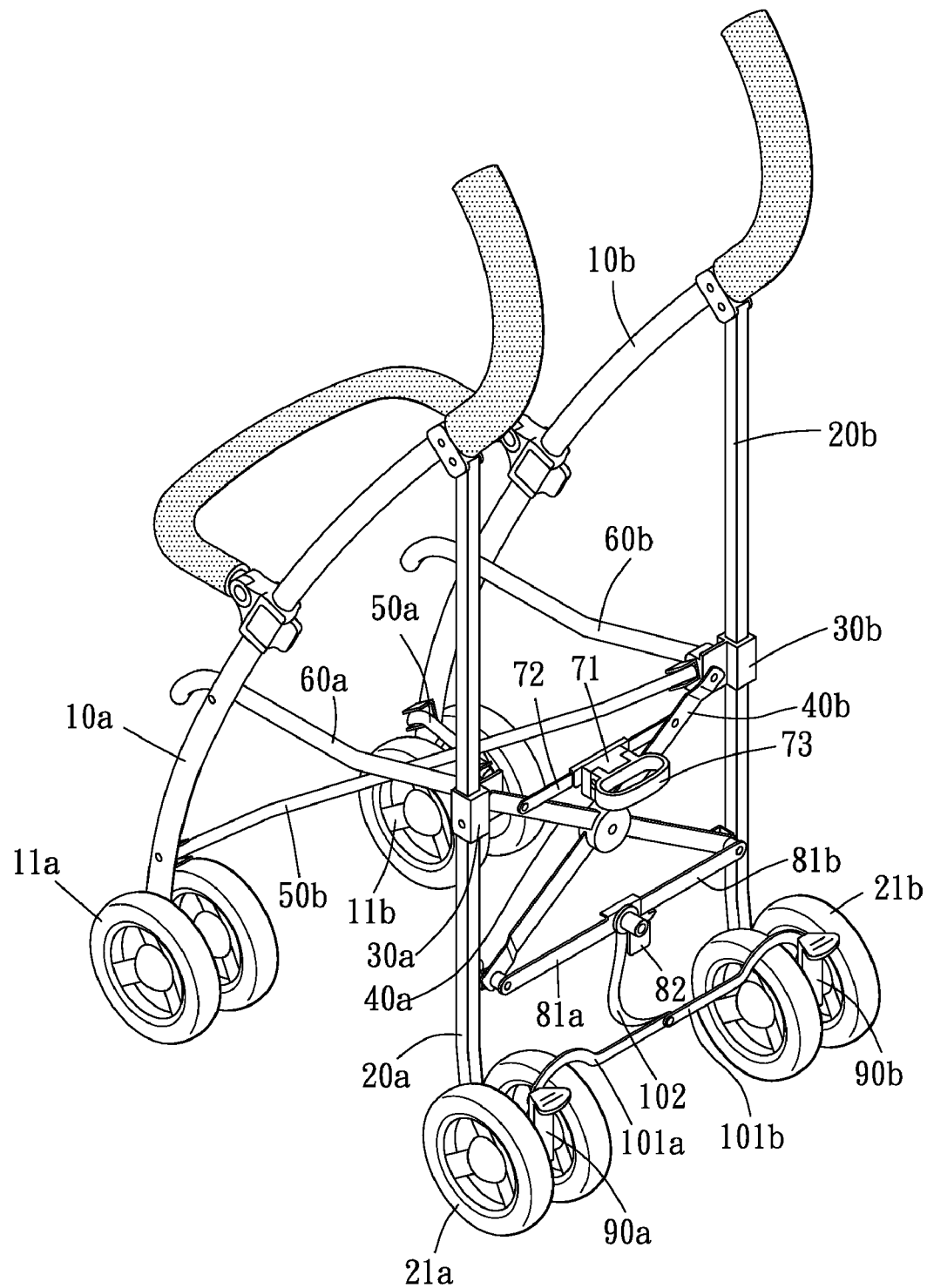
FIG. 1 is a stereogram showing a preferred embodiment of the present invention.
Figure 2:
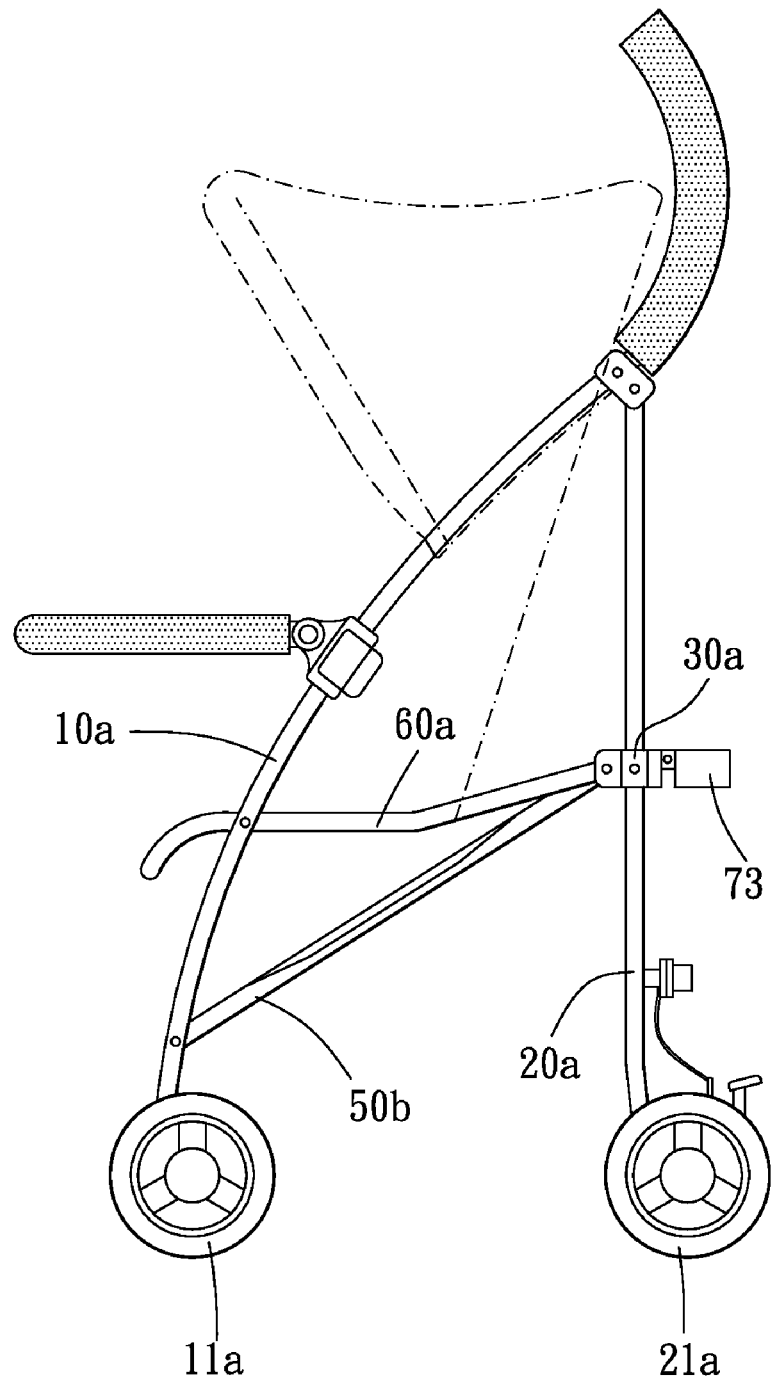
FIG. 2 is a side view showing a preferred embodiment of the present invention.

Please refer to FIG. 1 and FIG. 2 for a preferred embodiment of the present invention. The folding stroller of the present embodiment includes a first fore strut 10a, a first aft strut 20a, a second fore strut 10b, a second aft strut 20b, a first sliding member 30a, a second sliding member 30b, an aft double bar linkage, a fore double bar linkage, a first linking bar 60a, a second linking bar 60b, a pulling member, a fixation member, two braking member 90a, 90b, and a connecting member. The folding stroller has a first side and a second side.

The first fore strut 10a is located on the first side. A first fore wheel 11a is disposed on a bottom end of the first fore strut 10a. The second fore strut 10b is located on the second side. A second fore wheel 11b is disposed on a bottom end of the second fore strut 10b. A top end of every fore struts may be covered by a sheath. A protecting bar may be disposed between the first fore strut 10a and the second fore strut 10b to prevent babies from falling.

The first aft strut 20a is located on the first side. A top end of the first aft strut 20a is pivotally connected to the first fore strut 10a. A first aft wheel 21a is disposed on a bottom end of the first aft strut 20a. The second aft strut 20b is located on the second side. A top end of the second aft strut 20b is pivotally connected to the second fore strut 10b. A second aft wheel 21b is disposed on a bottom end of the second aft strut 20b.

The first sliding member 30a is slidably disposed on the first aft strut 20a. The first sliding member 30a is slidable between its first position and its second position. Also, the second sliding member 30b is slidably disposed on the second aft strut 20b, being slidable between its first position and its second position.

The aft double bar linkage includes a first aft bar 40a and a second aft bar 40b. A top end of the first aft bar 40a is pivotally connected to the first sliding member 30a. A bottom end of the first aft bar 40a is pivotally connected to a predetermined position of the second aft strut 20b. The predetermined position of the second aft strut 20b is located between the second sliding member 30b and the second aft wheel 21b. A top end of the second aft bar 40b is pivotally connected to the second sliding member 30b. A bottom end of the second aft bar 40b is pivotally connected to a predetermined position of the first aft strut 20a. The predetermined position of the first aft strut 20a is located between the first sliding member 30a and the first aft wheel 21a. The first aft bar and the second aft bar may be arranged in X-shaped and be pivotally connected to each other.

The fore double bar linkage includes a first fore bar 50a and a second fore bar 50b. A rear end of the first fore bar 50a is pivotally connected to the first sliding member 30a. A front end of the first fore bar 50a is pivotally connected to the second fore strut 10b. A rear end of the second fore bar 50b is pivotally connected to the second sliding member 30b. A front end of the second fore bar 50b is pivotally connected to the first fore strut 10a. The first fore bar and the second fore bar may be arranged in X-shaped and be pivotally connected to each other.

A front end of the first linking bar 60a is pivotally connected to the first fore strut 10a. A rear end of the first linking bar 60a is pivotally connected to the first sliding member 30a. A front end of the second linking bar 60b is pivotally connected to the second fore strut 10b. A rear end of the second linking bar 60b is pivotally connected to the second sliding member 30b.

The pulling member includes a linking piece 71, two linking units 72 and a handle 73. Each of the linking units 72 has two ends. One ends of the linking units 72 are pivotally connected to the linking piece 71. The other ends of the linking units 72 are pivotally connected to the first aft bar 40a and the second aft bar 40b separately. The handle 73 is pivotally connected to the linking piece 71 about a horizontal pivoting axis, so that the handle 73 can be folded by rotating about the pivoting axis. Both of the first sliding member 30a and the second sliding member 30b move to their first positions when the handle 73 is pulled upward by users.

The fixation member includes two fixation units 81a, 81b and a fixation clip 82. Each of the fixation units has two ends. One ends of the fixation units are pivotally connected to each other. The other ends of the fixation units are pivotally connected to the first aft strut 20a and the second aft strut 20b. The fixation clip 82 is disposed on one of the fixation units 81a. The fixation clip 82 locks the other fixation unit 81b when the fixation units are parallel with each other. As such, the first sliding member and the second sliding member are held on their second positions.

The braking members 90a, 90b are separately disposed on the first aft wheel 21a and the second aft wheel 21b. Each braking member has a braking end, a controlling end and an eccentric axis. The eccentric axis is located on the braking end. The braking ends rub separately against the first aft wheel and the second aft wheel when the braking members pivot downward about the eccentric axes.

The connecting member includes two connecting units 101a, 101b. Each of the connecting units has two ends. One ends of the connecting units are pivotally connected to each other. The other ends of the connecting units are separately connected to the controlling ends of the braking members, so that the braking members are in an operative relationship. Preferably, the connecting member further includes a connecting belt 102. One end of the connecting belt 102 is connected to the fixation units 81a, 81b. Another end of the connecting belt 102 is connected to the connecting units 101a, 101b. When the first sliding member and the second sliding member move toward their first positions, the fixation member can draw the connecting belt 101 to close the connecting units 101a, 101b up.

Figure 3:
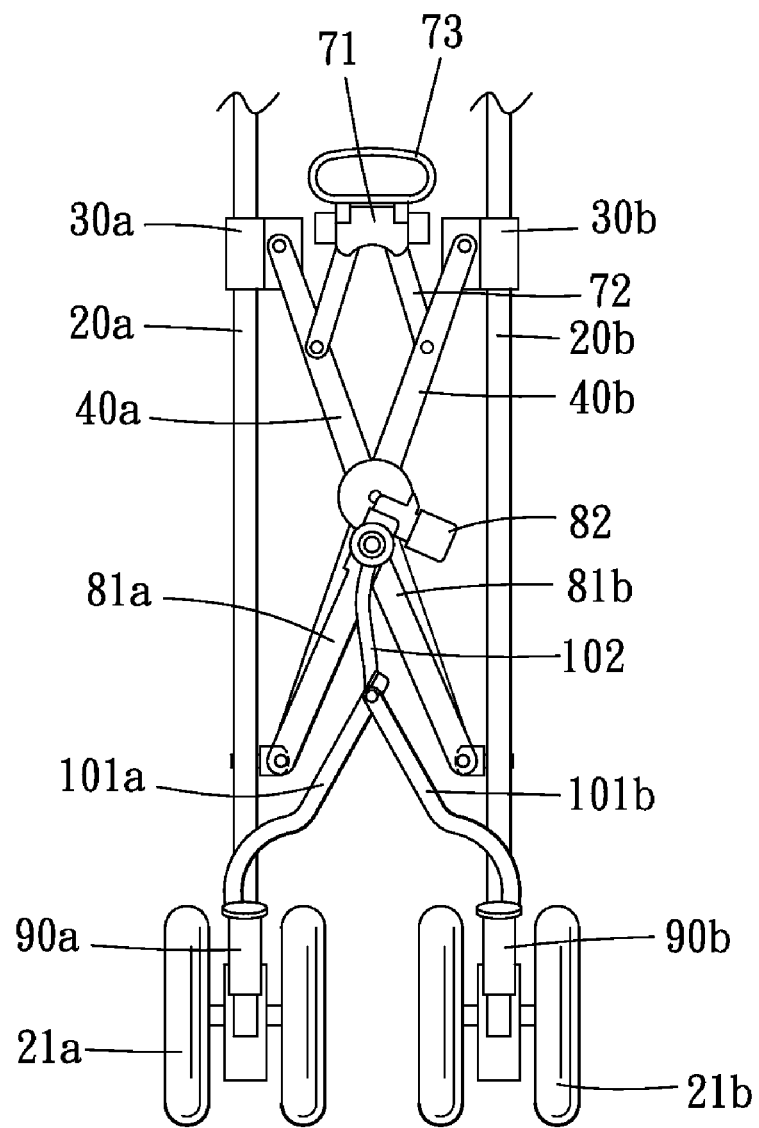
FIG. 3 is a partial back view showing a preferred embodiment of the present invention, wherein the first sliding member and the second member are located on their first position.

Please refer to FIG. 3. The first sliding member and the second sliding member bunch the fore double bar linkage and the aft double bar linkage up when the first sliding member and the second sliding member move upward to their first positions. As such, the first fore strut and second fore strut are closed up, and the first aft strut and the second aft strut are closed up. The first sliding member and the second sliding member also make the first linking bar and the second linking bar swing, so that the fore wheels and the aft wheels are closed up. Therefore, the folding stroller is folded for storage and transportation.

Figure 4:
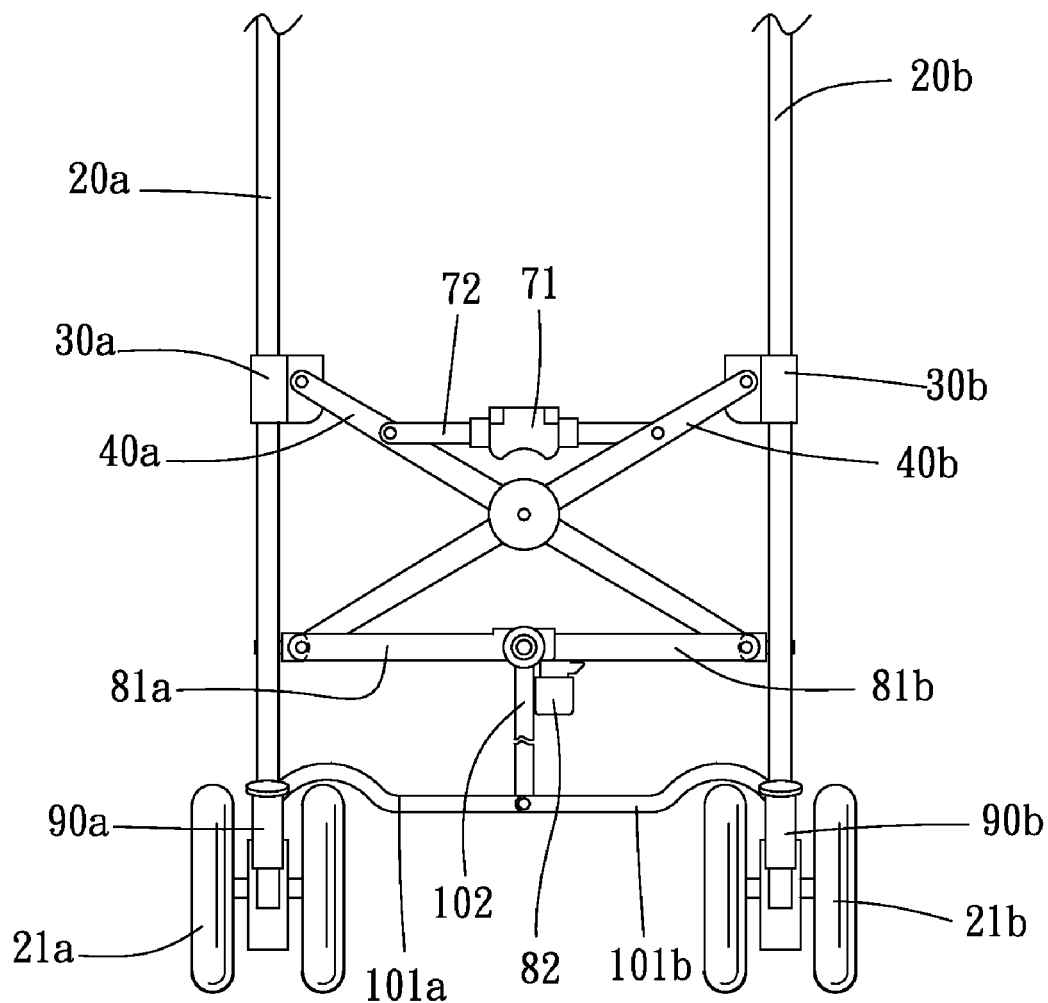
FIG. 4 is a partial back view showing a preferred embodiment of the present invention, wherein the first sliding member and the second member are located on their second position.

Please refer to FIG. 1 and FIG. 4. The first sliding member and the second sliding member unfold the fore double bar linkage and the aft double bar linkage when the first sliding member and the second sliding member move downward to their second positions. As such, the first fore strut and the second fore strut are opened up, and the first aft strut and the second aft strut are opened up. The first sliding member and the second sliding member also make the first linking bar and the second linking bar swing, so that the fore wheels and the aft wheels are opened up. Therefore, the folding stroller is unfolded for use.

In other possible embodiments of the present invention, the folding stroller may further include a first buckling member (not shown) and a second buckling member (not shown). The first buckling member is disposed on one of the first aft strut and the second aft strut. The second buckling member is disposed on one of the first sliding member and the second sliding member. The first buckling member and the second buckling member are in a buckling relationship when the first sliding member and the second sliding member are located on their second positions. As such, the first sliding member and second sliding member are held on their second positions. Moreover, it is also possible that two first buckling members are disposed on one of the first aft strut and the second aft strut. The second buckling member and one of the first buckling members may be in a buckling relationship when the first sliding member and the second sliding member are located on one of their first positions and their second positions. As such, the first sliding member and the second sliding member can be held in their first positions or their second positions. Moreover, at least a switch may be included in the folding stroller. The switch is assembled on one of the first sliding member and the second sliding member. The first buckling member and the second buckling member are lifted from the buckling relationship when the switch is pushed down. The first sliding member and the second sliding member are slidable with respect to the first aft strut and the second aft strut when users push down the switch.

What is claimed is:

1. A folding stroller, which has a first side and a second side, the folding stroller comprising:
    a first fore strut, located on the first side, a first fore wheel being disposed on a bottom end of the first fore strut;
    a first aft strut, located on the first side, a top end of the first aft strut being pivotally connected to the first fore strut, a first aft wheel being disposed on a bottom end of the first aft strut;
    a second fore strut, located on the second side, a second fore wheel being disposed on a bottom end of the second fore strut;
    a second aft strut, located on the second side, a top end of the second aft strut being pivotally connected to the second fore strut, a second aft wheel being disposed on a bottom end of the second aft strut;
    a first sliding member, slidably disposed on the first aft strut, the first sliding member being slidable between its first position and its second position;
    a second sliding member, slidably disposed on the second aft strut, the second sliding member being slidable between its first position and its second position;
    an aft double bar linkage, comprising a first aft bar and a second aft bar, a top end of the first aft bar being pivotally connected to the first sliding member, a bottom end of the first aft bar being pivotally connected to a predetermined position of the second aft strut, the predetermined position of the second aft strut being located between the second sliding member and the second aft wheel, a top end of the second aft bar being pivotally connected to the second sliding member, a bottom end of the second aft bar being pivotally connected to a predetermined position of the first aft strut, the predetermined position of the first aft strut being located between the first sliding member and the first aft wheel;
    a fore double bar linkage, comprising a first fore bar and a second fore bar, a rear end of the first fore bar being pivotally connected to the first sliding member, a front end of the first fore bar being pivotally connected to the second fore strut, a rear end of the second fore bar being pivotally connected to the second sliding member, a front end the second fore bar being pivotally connected to the first fore strut;
    a first linking bar, a front end of the first linking bar being pivotally connected to the first fore strut, a rear end of the first linking bar being pivotally connected to the first sliding member;
    a second linking bar, a front end of the second linking bar being pivotally connected to the second fore strut, a rear end of the second linking bar being pivotally connected to the second sliding member;
    wherein the first sliding member and the second sliding member bunch the fore double bar linkage and the aft double bar linkage up when the first sliding member and the second sliding member move upward to their first positions, so that the first fore strut and second fore strut are closed up, the first aft strut and the second aft strut are closed up, the first sliding member and the second sliding member make the first linking bar and the second linking bar swing simultaneously, so that the fore wheels and the aft wheels are closed up;
    wherein the first sliding member and the second sliding member unfold the fore double bar linkage and the aft double bar linkage when the first sliding member and the second sliding member move downward to their second positions, so that the first fore strut and the second fore strut are opened up, the first aft strut and the second aft strut are opened up, the first sliding member and the second sliding member make the first linking bar and the second linking bar swing simultaneously, so that the fore wheels and the aft wheels are opened up.

2. The folding stroller of claim 1, further comprising a pulling member, the pulling member comprising a linking piece, two linking units and a handle, each of the linking units having two ends, one ends of the linking units being pivotally connected to the linking piece, the other ends of the linking units being pivotally connected to the first aft bar and the second aft bar separately, the handle being pivotally connected to the linking piece about a horizontal pivoting axis, both of the first sliding member and the second sliding member moving to their first positions when the handle being pulled upward.

3. The folding stroller of claim 1, further comprising a fixation member, the fixation member comprising two fixation units and a fixation clip, each of the fixation units having two ends, one ends of the fixation units being pivotally connected to each other, the other ends of the fixation units being pivotally connected to the first aft strut and the second aft strut separately, the fixation clip being disposed on one of the fixation units, the fixation clip locking the other one of the fixation units when the fixation units being parallel with each other, at the same time, the first sliding member and the second sliding member being located at their second positions.

4. The folding stroller of claim 3, further comprising two braking members and a connecting member, the braking members being separately disposed on the first aft wheel and the second aft wheel, each braking member having a braking end, a controlling end and an eccentric axis, the eccentric axis being located on the braking end, the braking ends rubbing against the first aft wheel and the second aft wheel when the braking members pivoting downward about the eccentric axes, the connecting member having two connecting units, each of the connecting units having two end, one ends of the connecting units being pivotally connected to each other, the other ends of the connecting units being separately connected to the controlling ends, so that the braking members being in an operative relationship.

5. The folding stroller of claim 4, wherein the connecting member has a connecting belt, one end of the connecting belt is connected to the fixation units, and another end of the connecting belt is connected to the connecting units, the connecting belt closes the connecting units up when the first sliding member and the second sliding member moves to their first positions.

6. The folding stroller of claim 1, wherein a first buckling member is disposed on one of the first aft strut and the second aft strut, a second buckling member is disposed on one of the first sliding member and the second sliding member, the first buckling member and the second buckling member are in a buckling relationship when the first sliding member and the second sliding member are located on their second positions.

7. The folding stroller of claim 1, wherein two first buckling members are disposed on one of the first aft strut and the second aft strut, a second buckling member is disposed on one of the first sliding member and the second sliding member, the second buckling member and one of the first buckling members are in a buckling relationship when the first sliding member and the second sliding member are located on one of their first positions and their second positions.

8. The folding stroller of claim 6, wherein at least one of the first sliding member and the second sliding member is assembled with a switch, the first buckling member and the second buckling member are lifted from the buckling relationship when the switch is pushed down, so that the first sliding member and the second sliding member are slidable with respect to the first aft strut and the second aft strut.

* * * * *